(12) United States Patent
Robinson et al.

(10) Patent No.: US 8,842,937 B2
(45) Date of Patent: Sep. 23, 2014

(54) SPECTRAL IMAGE DIMENSIONALITY REDUCTION SYSTEM AND METHOD

(75) Inventors: Ian S. Robinson, Redondo Beach, CA (US); Bradley A. Flanders, Whittier, CA (US)

(73) Assignee: Raytheon Company, Waltham, MA (US)

(*) Notice: Subject to any disclaimer, the term of this patent is extended or adjusted under 35 U.S.C. 154(b) by 52 days.

(21) Appl. No.: 13/302,504

(22) Filed: Nov. 22, 2011

(65) Prior Publication Data

US 2013/0129256 A1 May 23, 2013

(51) Int. Cl.
G06K 9/32 (2006.01)
G06K 9/62 (2006.01)
G06K 9/00 (2006.01)
G06T 9/00 (2006.01)

(52) U.S. Cl.
CPC ............ G06K 9/0063 (2013.01); G06K 9/6231 (2013.01); G06K 9/6247 (2013.01); G06T 9/00 (2013.01)
USPC ........... 382/298; 382/235; 382/252; 382/275; 358/539; 358/3.26

(58) Field of Classification Search
USPC .......... 382/235, 243, 252, 274, 275; 358/539, 358/3.26, 3.27
See application file for complete search history.

(56) References Cited

U.S. PATENT DOCUMENTS

| | | | |
|---|---|---|---|
| 6,075,891 A | 6/2000 | Burman | |
| 6,208,752 B1 | 3/2001 | Palmadesso et al. | |
| 6,665,438 B1 | 12/2003 | Lin | |
| 6,701,021 B1 | 3/2004 | Qian et al. | |
| 6,750,964 B2 | 6/2004 | Levenson et al. | |
| 6,782,138 B1 | 8/2004 | Leisner et al. | |
| 6,804,400 B1 | 10/2004 | Sharp | |
| 6,859,275 B2 | 2/2005 | Fateley et al. | |
| 6,940,999 B2 | 9/2005 | Lin | |

(Continued)

FOREIGN PATENT DOCUMENTS

| CN | 101763445 | 6/2010 |
|---|---|---|
| WO | 2010056254 A1 | 5/2010 |
| WO | 2010141114 A2 | 12/2010 |

OTHER PUBLICATIONS

Manolakis et al.; "Is there a best hyperspectral detection algorithm?"; SPIE—Newsroom; pp. 1-3 (2009).

(Continued)

*Primary Examiner* — Yosef Kassa
(74) *Attorney, Agent, or Firm* — Burns & Levinson LLP; Joseph M. Maraia

(57) ABSTRACT

Methods for reducing dimensionality of hyperspectral image data having a number of spatial pixels, each associated with a number of spectral dimensions, include receiving sets of coefficients associated with each pixel of the hyperspectral image data, a set of basis vectors utilized to generate the sets of coefficients, and either a maximum error value or a maximum data size. The methods also include calculating, using a processor, a first set of errors for each pixel associated with the set of basis vectors, and one or more additional sets of errors for each pixel associated with one or more subsets of the set of basis vectors. Utilizing such errors calculations, an optimum size of the set of basis vectors may be ascertained, allowing for either a minimum amount of error within the maximum data size, or a minimum data size within the maximum error value.

20 Claims, 4 Drawing Sheets

(56) References Cited

U.S. PATENT DOCUMENTS

| | | | |
|---|---|---|---|
| 6,952,499 | B1 | 10/2005 | Vititoe |
| 7,180,588 | B2 | 2/2007 | Geshwind et al. |
| 7,194,111 | B1 | 3/2007 | Schaum et al. |
| 7,251,376 | B2 | 7/2007 | Qian et al. |
| 7,356,201 | B2* | 4/2008 | Gunther et al. ............... 382/294 |
| 7,463,778 | B2* | 12/2008 | Damera-Venkata .......... 382/236 |
| 7,486,734 | B2* | 2/2009 | Machida ................. 375/240.25 |
| 7,680,337 | B2 | 3/2010 | Gruninger |
| 7,773,828 | B2* | 8/2010 | Sakata et al. .................. 382/294 |
| 8,045,764 | B2* | 10/2011 | Hamza .......................... 382/117 |
| 8,077,982 | B2* | 12/2011 | Ichikawa ...................... 382/218 |
| 8,150,195 | B2 | 4/2012 | Demirci et al. |
| 8,165,344 | B2* | 4/2012 | Shirasaka ..................... 382/103 |
| 8,175,393 | B2 | 5/2012 | Robinson et al. |
| 8,314,890 | B2* | 11/2012 | Hosokawa et al. ........... 348/606 |
| 8,315,472 | B2 | 11/2012 | Robinson et al. |
| 8,391,961 | B2 | 3/2013 | Levenson et al. |
| 8,422,558 | B2* | 4/2013 | Bhaumik et al. ......... 375/240.16 |
| 8,488,846 | B2* | 7/2013 | Hamza .......................... 382/117 |
| 8,503,530 | B2* | 8/2013 | Miao et al. ............... 375/240.16 |
| 8,508,402 | B2* | 8/2013 | Duran Toro et al. ............. 342/22 |
| 8,515,134 | B2* | 8/2013 | Barenbrug et al. ............ 382/107 |
| 8,515,150 | B2* | 8/2013 | Mangoubi et al. ............ 382/133 |
| 8,606,026 | B2* | 12/2013 | Ueda ............................. 382/236 |
| 2003/0012398 | A1 | 1/2003 | Sunshine et al. |
| 2004/0218172 | A1 | 11/2004 | DeVerse et al. |
| 2006/0188161 | A1 | 8/2006 | Gruninger et al. |
| 2006/0247514 | A1 | 11/2006 | Panasyuk et al. |
| 2009/0074297 | A1 | 3/2009 | Robinson |
| 2010/0141114 | A1 | 6/2010 | Jermann et al. |
| 2010/0303371 | A1 | 12/2010 | Robinson et al. |
| 2012/0224782 | A1 | 9/2012 | Robinson et al. |

OTHER PUBLICATIONS

Rogge et al.; "Iterative Spectral Unmixing for Optimizing Per-Pixel Endmember Sets"; IEEE Trans. on Geoscience and Remote Sensing; 44(12):3725-3736 (2006).

Bowles, Jeffrey H. et al. "An Optical Real-Time Adaptive Spectral Identification System (ORASIS)", pp. 77-106, Hyperspectral Data Exploitation: Theory and Applications, 2007, John Wiley & Sons, Inc.

Christophe, Emmanuel "Hyperspectral Data Compression Tradeoff", pp. 9-29, Optical Remote Sensing, 2011, Springer Verlag, DE.

Fowler, James E., "Three-Dimensional Wavelet-Based Compression of Hyperspectral Imagery" pp. 379-407, Hyperspectral Data Exploitation: Theory and Applications, 2007, John Wiley & Sons, Inc.

Serpico, Sebastiano B., "Feature Reduction for Classification Purpose" pp. 245-274, Hyperspectral Data Exploitation: Theory and Applications, 2007, John Wiley & Sons, Inc.

Fukunaga, K., "Feature Extraction and Linear Mapping for Signal Representation" pp. 399-440, Introduction to Statistical Pattern Recognition, 1990.

Robinson, Comparison of Hyperspectral Sub Pixel Detection with and without prior knowledge of target features, 1998 IEEE Snowmass at Aspen, cO Mar. 21-28, 1998, v. 5, pp. 183-189.

International Report on Patentability, dated Aug. 29, 2011 of PCT/US2010.024192 filed Feb. 12, 2010.

Sun, "Improved iterative error analysis for endmember extraction from hyperspecrtral imagery," SPIE Imaging Spectrometry X111 v. 708, 2008.

Rogge, "Iterative spectral unmixing for optimizing per pixel endmember sets," IEEE Transactions on Geoscience and remote sensing, v. 44, 2006.

Veganzones, "Endmember extraction methods, a Shrot review," pp. 400-407 (Sep. 2008).

Duran, et al., "A time-efficient method for anomaly detection in hyperspectral images," IEEE Transactions in Geoscience and Remote Sensing, vol. 45, No. 12, pp. 3894-3904, Dec. 2007.

Plaza, "Spatial/Spectral Endmember Extraction by Multidimensional morphological operations," IEEE Transactions on Geoscience and Remote Sensing, Elsevier, vol. 40, 2002.

Plaza, "A new approach to mixed pixel classification of hyperspectral imagery based on extended morphological profiles," Pattern Recognition, Elsevier, vol. 37, 2004.

Rogge, "Integration of spatial-spectral information for the improved extraction of endmembers," Remote Sensing of Environment, Elsevier, vol. 110, No. 3, pp. 1097-1116 (Jun. 2004).

Filippi, "Support vector machine-based endmember extraction," IEEE Transactions on Geoscience and Remote Sensing, vol. 47, No. 3, pp. 771-791, Mar. 2009.

International Search Report and Written Opinion, dated Apr. 27, 2011 of PCT/US2010/024192 filed Feb. 12, 2010.

Partial International Search Report, PCT/US2010/024192 filed Feb. 12, 2010, dated Feb. 21, 2011.

Nirmal Keshava, "Spectral unmixing," IEEE Signal Processing Magazine, vol. 19, 2002.

International Search Report for International Patent Application No. PCT/US2008/083738 dated Feb. 9, 2009.

Kuybeda, "Global unsupervised anomaly extraction and discrimination in hyperspectral images," 2008, webee.technion.ac.il/uploads/file/publication/684.pdf.

Manolakis, "Is there a best hyperspectral detection algorithm?" SPIE Newsroom, pp. 1-3, 2009.

Bayazit, "Region adaptive spectral transformation for wavelet based color image compression," IEEE International Conference on Image Processing, 2009.

Dohyun, "Rate distortion optimized image compression using generalized principal component analysis" 2006 IEEE International Conference on Toulouse, 2006.

Memarsadeghi, et al., "A fast implementation of the isodata clustering algorithm," IJCGA, vol. 17, No. 1, pp. 71-103, 2007.

Wei, "Empirical comparison of fast clustering algorithms for large data sets" Proceedings of the 33rd Hawaii International Conference on System Sciences, pp. 1-10, 2000.

Yan, "Fast approximate spectral clustering" KDD, Jun. 28-Jul. 1, 2009, Paris, France.

Meza, et al., "Applied non-uniformity correction algorithm for striping noise removal in hyperspectral images," http://nuc.die.udec.ci/publications/papers/2010-NUCStrippingNoise.pdf, Nov. 20, 2012.

Jiang, "A robust estimation of virtual dimensionality in hyperspectral imagery" 2010 International Conference on Computational Problem Solving, 2010.

Harsanyi, Hyperspectral image classification and dimensionality reduction.

Neville, et al., "Automatic endmember extraction from hyperspectral data for mineral exploration," 4th International Airborne remote sensing conference exhibition/21st Canadian Symposium on Remote Sensing, pp. 891-896, 1999.

Orthogonality and Least Squares, http://www.aerostudents.com/files/linearAlgebra/orthogonalityLeastSquares.pdf Jul. 2009.

Duarte, et al., "Structured compressed sensing from theory to applications," IEEE Transactions in Signal Processing, IEEE Service Center, New York, vol. 59, No. 9, Sep. 1, 2011.

Pickering, et al., "Compression of hyperspectral data using vector quantisation and the discrete cosine transform," Image Processing, 2000, Proceedings, 2000 International Conference of Sep. 10-13, 2000, IEEE, Piscatawey, NJ, Sep. 10, 2000, pp. 195-198, vol. 2.

Manolakis, et al., "Hyperspectral image processing for automatic target detection applications," http://www.cis.rit.edu/cnspci/references/dip/manolakis2003.pdf.

Leathers, et al., "Scene-based nonuniformity corrections for optical and SWIR pushbroom sensors," Optics Express, 13(13):5136-5150 (Jun. 27, 2005).

Winter, "Comparison of approaches for determining end-members in hyperspectral data," IEEE 2000.

Plaza, et al., A quantitative and comparative analysis of endmember extraction algorithms from hyperspectral data, IEEE 2004.

Boardman, et al., "Mapping target signatures via partial unmixing of aviris data," Citeseer 1995.

Winter, "N-FINDR: an algorithm for fast autonomous spectral endmember determination in hyperspectral data," SPIE 1999.

\* cited by examiner

SPECTRAL IMAGE DIMENSIONALITY REDUCTION SYSTEM AND METHOD

CROSS-REFERENCE TO RELATED APPLICATIONS

This application is related to U.S. patent application Ser. No. 13/085,883, entitled "Optimized Orthonormal System and Method for Reducing Dimensionality of Hyperspectral Images," filed Apr. 13, 2011, U.S. patent application Ser. No. 12/475,145, entitled "System and Method for Reducing Dimensionality of Hyperspectral Images," filed May 29, 2009, and U.S. patent application Ser. No. 11/856,588, entitled "Hyperspectral Image Dimension Reduction System and Method," filed Sep. 17, 2007, the disclosures of each of which are hereby incorporated by reference in their entireties.

BACKGROUND

This disclosure relates to dimensionality reduction of hyperspectral image data, based on an optimized set of basis vectors. While compression reduces the size of a data set, it typically results in a loss of access to information content. On the other hand, dimensionality reduction techniques provide compression with the ability to extract information from the data set in its reduced size. Thus, while all dimensionality reduction techniques provide compression, not all compression techniques allow for dimensionality reduction.

Hyperspectral sensors can collect image data across a multitude of spectral bands through a combination of technology associated with spectroscopy and remote imaging. Thus, such sensors can capture sufficient information to derive an approximation of the spectrum for each pixel in an image. In addition to having a color value, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable.

Although the transmission rate for hyperspectral images can be increased using existing lossy and/or lossless compression techniques, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type data than that which the algorithms were designed to compress. Thus, existing lossless compression algorithms do not provide a suitable guaranteed compression factor for hyperspectral images, and in certain cases, the decompressed data set may even be larger than the original data set.

Dimensionality reduction techniques strike a balance between the loss of data resulting from lossy compression, and the increased processing requirements of lossless techniques. For example, the dimensionality reduction techniques may identify information that is of particular importance, and segregate it such that it is not reduced, while reducing the remaining information that is of less value. Thus, the use of dimensionality reduction on hyperspectral data sets allows for transformation of the hyperspectral image into a more compact form, with little to no loss of the most relevant information. At the same time, it is advantageous for dimensionality reduction techniques to facilitate rapid processing of a reduced hyperspectral image data set. In the case of hyperspectral imaging data, this generally means that the dimensionality reduced data may be exploited for target detection, anomaly detection, material identification, classification mapping, or so on. Typically for dimensionality reduction of hyperspectral images, a family of functions or a set of vectors are found whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers or basis vectors. While basis vectors span the data obtained from the image, and form a mathematical basis for the data, endmembers are pixels from an imaged scene (or extrapolations of pixels in the scene), that represent the spectra of a pure material found in the scene. In some cases, endmembers are derived such that they enclose or bound the data set (as in a hypervolume or a simplex).

It may be appreciated that post-processing techniques may operate on dimensionality reduced data (DIMRED data) that is generated from hyperspectral image data (HSI data) that has been processed using one or more of a variety of analysis techniques, or may utilize the results of generating the DIMRED data to operate on the original HSI data. For example, post-processing techniques may be applied to the dimensionality reduced output of techniques such as those disclosed in the related applications incorporated by reference above, which compute geometric basis vectors. Post-processing techniques may also be applied to the dimensionality reduced outputs of other hyperspectral image processing mechanisms, including but not limited to Principal Components Analysis, which computes "statistically derived' basis vectors that span a scene in an optimal mean-square sense. Regardless, it may be appreciated that among other things, it is advantageous to increase the speed at which the dimensionality of hyperspectral images is reduced, improve reduction of data volume sizes, and/or improve the identification of which data is to be segregated for reduction or not.

SUMMARY

According to an embodiment a method for reducing dimensionality of hyperspectral image data having a number of spatial pixels, each associated with a number of spectral dimensions, includes receiving sets of coefficients associated with each pixel of the hyperspectral image data, a set of basis vectors utilized to generate the sets of coefficients, and a maximum error value. The method also includes calculating, using a processor, a first set of errors for each pixel associated with the set of basis vectors, and one or more additional sets of errors for each pixel associated with one or more subsets of the set of basis vectors. The method additionally includes calculating, using the processor, a percent of the number of spatial pixels having an error greater than the maximum error value, for each of the first set of errors and the one or more additional sets of errors. The method also includes calculating, using the processor, a plurality of reduction factors associated with each of the first set of errors and the one or more additional sets of errors, the plurality of reduction factors being calculated based on both the percent of the number of spatial pixels having the error greater than the maximum error value and the number of spectral dimensions associated with the hyperspectral image data. The method further includes selecting, using the processor, a maximum reduction factor from the plurality of reduction factors, and an optimum size of the set of basis vectors or the subset of basis vectors associated therewith.

According to another embodiment, a method for reducing dimensionality of hyperspectral image data having a number of spatial pixels, each associated with a number of spectral dimensions, includes receiving sets of coefficients associated with each pixel of the hyperspectral image data, a set of basis vectors utilized to generate the sets of coefficients, and a maximum data size value. The method also includes calculating, using a processor, a maximum number of members in the set of basis vectors based on the maximum data size value and the number of spatial pixels, and establishing a maximum subset of the set of basis vectors associated with the maximum data size. The method additionally includes calculating, using the processor, a first set of errors for each pixel associated with the maximum subset of basis vectors, and one or more additional sets of errors for each pixel associated with one or more subsets of the maximum subset of basis vectors. The method also includes calculating, using the processor, a percent of the number of spatial pixels that can be set aside, based on the maximum data size, for each of the maximum subset of basis vectors and the one or more additional subsets of basis vectors. The method additionally includes calculating, using the processor, a plurality of maximum error values associated with each of the percents of the numbers of spatial pixels that can be set aside, associated with each of the maximum subset of basis vectors and the one or more additional subsets of basis vectors. The method further includes selecting, using the processor, a minimum error value from the plurality of maximum error values, and an optimum size of the maximum subset of basis vectors or the one or more additional subsets of the maximum subset of basis vectors associated therewith.

Other features of this disclosure and the inventive concept described herein will be apparent to those skilled in the art based on the following drawings and detailed description.

DETAILED DESCRIPTION

Figure 1:
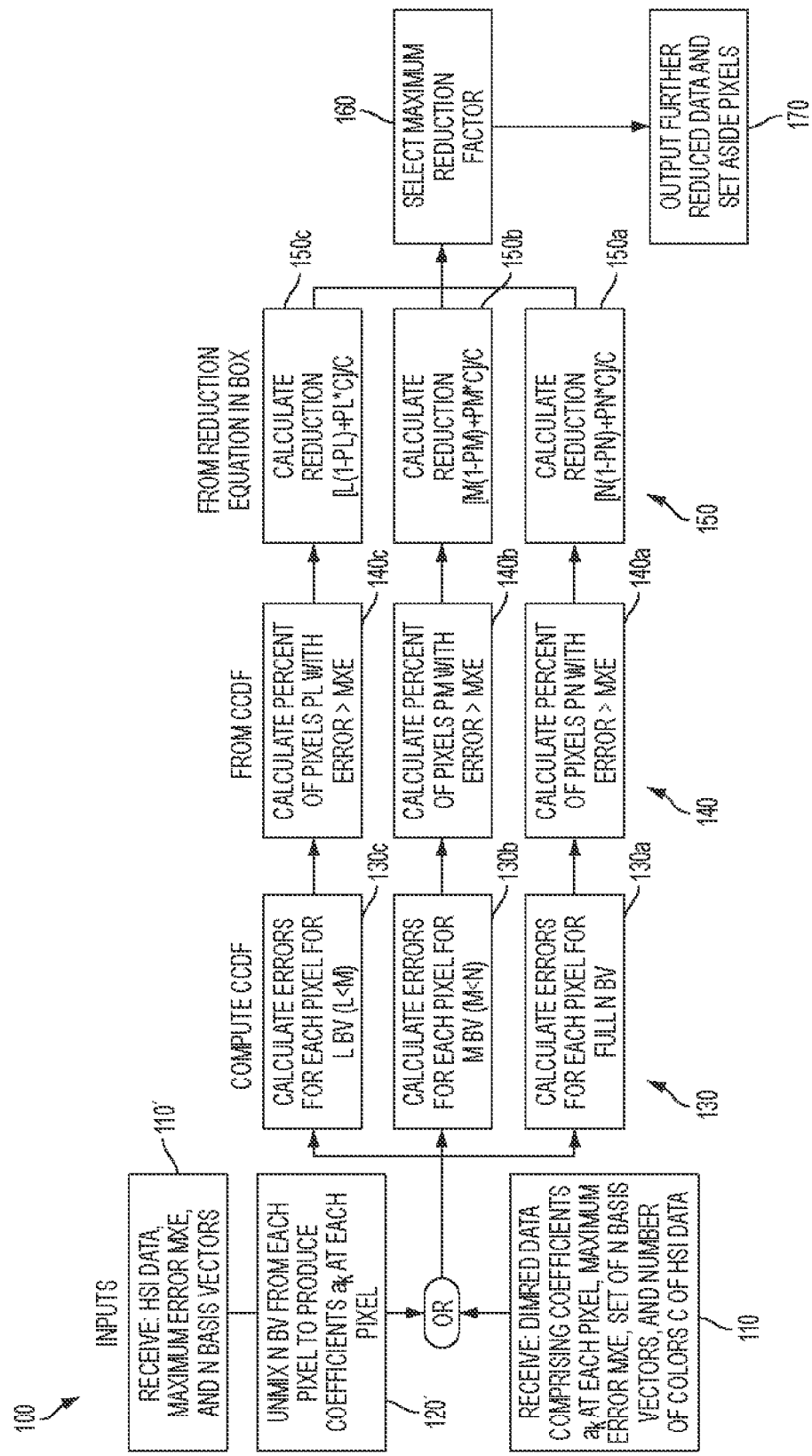
FIG. 1 illustrates an embodiment of a method for further reducing dimensionality of dimensionally reduced data associated with a hyperspectral image, minimizing data size based on a maximum error level.

During many types of hyperspectral image processing, a set of basis vectors are generated which may be used to reduce the dimensionality of the hyperspectral image data by unmixing. Unmixing may be unconstrained unmixing or constrained so that unmixing coefficients are non-negative and/or sum to unity. In preferred embodiments, unconstrained unmixing may be employed, as it is generally faster and simpler than other unmixing techniques, and the basis vectors derived are not intended to be endmembers. It may be appreciated that the number of basis vectors needed to accurately represent the hyperspectral image data may vary depending on the processing technique. While some processing techniques, such as Principal Components Analysis, compute a basis vector for every color of hyperspectral data (although not all are necessarily retained), in other processing techniques, such as that described in U.S. patent application Ser. No. 13/085,883, the number of basis vectors computed is a user-selectable variable. It may be appreciated that regardless of how many basis vectors are computed, this number may ultimately be reduced, so as to either minimize the amount of data retained (i.e. the volume of the reduced data) for a given error level, or to minimize the error level (i.e. the worst-case error or the root mean square "RMS" error between an unreduced pixel and its reduced counterpart) computed for any pixel for a given amount of data retained. It may be appreciated that the fewer basis vectors being retained, the greater the reduction/compression, however, the larger the error (in particular in the tails of the data). It is clear, however, that the full set of unreduced pixels is of a much greater data volume.

Methods are disclosed herein for reducing DIMRED data or HSI data as further reduced data. Although in some embodiments the methods may be performed immediately following one or more processing techniques that generate a set of basis vectors associated with the HSI data and/or the DIMRED data, in other embodiments the methods may be performed as a separate process, at a later time, or on a separate computational system. In an embodiment, the one or more processing techniques are performed on a per-pixel basis (i.e. for each X,Y spatial location of the HSI or DIMRED data). The original HSI data will have C colors at each spatial location. The DIMRED data will consist of pixels with fewer than C elements at each X,Y spatial location, plus selected unreduced pixels that retain C colors. All pixels in the scene that are reduced, are reduced by unmixing the original pixels with N basis vectors, as described below. The resulting unmixing coefficients form the elements of the DIMRED data, and may be used along with the N basis vectors to form an approximation of the original HSI data at each pixel.

In an embodiment, prior to one or more of the methods being performed, a user may select which method is to be run, by designating whether a maximum value is to be established for the further reduced data volume or the further reduced data error levels. Such a selection may be made by any appropriate mechanism, including but not limited to receiving a user input of the selection on a graphical user interface associated with a system performing the methods. In other embodiments, the system may have associated therewith one of the methods, fixing either the further reduced data volume or the further reduced data error levels.

FIG. 1 illustrates an embodiment of method 100, configured to generate further reduced data from the HSI data or the DIMRED data, wherein the further reduced data has a selected amount of worst case error. To be clear, where the user selects a maximum error level, method 100 is configured to minimize the volume of the HSI data or the DIMRED data, so as to form a smaller size of further reduced data, by reducing the number of spectral dimensions associated with each pixel of the HSI data or the DIMRED data. Accordingly, in an embodiment method 100 may begin at 110 by receiving the user selected maximum error mxe, the HSI data, as well as a set of N basis vectors associated with the HSI data. It may be appreciated that the set of N basis vectors may comprise an output of the processing techniques on the HSI data, and may have a number of spatial pixels and reduced dimension of spectral data. In some alternative embodiments, as generally indicated at 110', DIMRED data that is derived from HSI data (i.e. generated utilizing the processes that establish the set of N basis vectors) may be received. As described in greater detail below, the DIMRED data may contain a set of coefficients associated with each spatial pixel. As further indicated below, where the DIMRED data is received instead of the HSI data, a number of colors C associated with each pixel of the unreduced HSI data may be transmitted with the DIMRED data, such that a useful comparison of dimensionality reduction may subsequently be performed. As further indicated below, where the DIMRED data is received instead of the HSI data, the magnitude p of each pixel of the unreduced HSI data may be transmitted with the DIMRED data, such that residual errors for different sets of coefficients may subsequently be calculated. It may be appreciated that where the DIMRED data is received at 110, the HSI data may be available to provide additional set-aside pixels based on the optimization performed in method 100. In some embodiments the DIMRED data may include therein residual/uncompressed data from the hyperspectral image that was not reduced in dimensionality. Although in some embodiments the elements received at 110 or 110' may be received as discrete data files or user-inputs, in other embodiments some of the elements may be bundled together. For example, in an embodiment a single file may contain both the HSI or DIMRED data and the N basis vectors.

In an embodiment where the data received at 110 includes the DIMRED data as well as the set of N basis vectors used to create the DIMRED data (i.e. used to reduce the dimensionality of the original hyperspectral data into the DIMRED data), the DIMRED data may have N dimensions associated therewith, such that each spatial pixel of the DIMRED data may be an N-dimensional vector $\vec{a}$, having a plurality of elements $a_k$, where k ranges from 1 to N. Each of the N basis vectors (individually $\vec{b}_k$), which are used for all spatial pixels, may also be a spectrum with C colors, with k ranging from 1 to N. It may then be appreciated that each pixel vector $\vec{p}$ of the HSI data, may then be approximated as a linear combination of the N basis vectors, with the coefficients $a_k$ of the DIMRED data, such that each pixel vector $\vec{p}$ may generally conform to the formula:

$$\vec{p} = \sum_{k=1}^{N} a_k \vec{b}_k + \vec{R},$$

where $a_k$ are the reduced dimension coefficients for each pixel, and the N basis vectors $\vec{b}_k$ are common for the whole scene. Additionally, $\vec{R}$ may be appreciated as the residual vector, or the error vector.

It may be appreciated that in some embodiments, the N basis vectors may be every basis vector utilized in generating the DIMRED data, or are otherwise associated with the HSI data, while in other embodiments, the N basis vectors may be a subset of the basis vectors utilized in generating the DIMRED data or are otherwise associated with the HSI data. In some embodiments where the N basis vectors are a subset of the basis vectors used to generate the DIMRED data or otherwise associated with the HSI data, the number N of basis vectors may be selected as a user input. In an embodiment, the set of N basis vectors received at 110 or 110' may be in an order established during the generation of the DIMRED data or during the processing of the HSI data (i.e. where the set of N basis vectors are generated sequentially). For example, the set of N basis vectors may be generated using the process described in U.S. patent application Ser. No. 13/085,883, incorporated by reference above. In another embodiment, where the set of N basis vectors was generated using Principal Components Analysis, the set of N basis vectors may be in the order of largest to smallest associated eigenvalues (whereby the eigenvalue indicates how much an associated eigenvector contributes to the whole spatial scene). In one such embodiment, the set of N basis vectors may then be those that had the largest associated eigenvalues.

While in some embodiments, such as where method 100 immediately follows the processing technique that generates the set of N basis vectors as a post-processing technique, the data received at 110 or 110' may be obtained from random access memory associated with the system and used to process the HSI data or otherwise generate the DIMRED data, in other embodiments such as where method 100 is being performed later, the data received at 110 or 110' may be stored in one or more data files stored in a storage medium, such as but not limited to being on one or more hard drives or solid state drives. In some embodiments, such as where the method 100 is performed as a post-processing step that has access to data utilized in reducing the dimensionality of the hyperspectral image data to the DIMRED data or otherwise processing the HSI data to generate the set of N basis vectors, the data received at 110 or 110' may include the results of the computations that calculated the N basis vectors. In some such embodiments, those computations and results may be available for performing the further reduction of method 100. In other embodiments, however, one or more of the computations may need to be recalculated if otherwise unavailable. For example, in some embodiments where the HSI data is received at 110', method 100 may continue at 120' by unmixing the maximum number of N basis vectors from each pixel of the HSI data to generate the coefficients $a_k$ of the DIMRED data. Unmixing, as used herein without further modifiers, is understood to generically refer to the broad concept of unconstrained unmixing. As described below, unmixing the basis vectors $\vec{b}_k$ from each pixel $\vec{p}$ is utilized in calculating the error vector $\vec{R}$ associated with each pixel $\vec{p}$, and the associated magnitude $R_{mag}$, when minimizing the data size to further reduce the dimensionality of the data within a maximum error amount mxe. As additionally discussed, where the basis vectors $\vec{b}_k$ are orthonormal, the unmixing step for the largest set of N basis vectors may be completed by computing the dot product of each basis vector with each spatial pixel. The result of the dot product with basis vector $\vec{b}_k$ and a pixel $\vec{p}$ provides coefficient $a_k$ for that pixel $\vec{p}$ all at once. It may be appreciated, however, that where the N basis vectors are not orthonormal, calculating the error with a smaller subset of the N basis vectors would require repeating the unmixing step for that smaller subset of basis vectors. Additionally, in some embodiments the N basis vectors may be converted to an orthonormal set that spans an equivalent vector subspace, utilizing any conventional computational method.

In the illustrated embodiment, it may be presumed that the basis vectors are orthonormal to one another. As such, having the set of coefficients $a_k$, either from being received in the DIMRED data at 110, or computed from the unmixing at 120' when the HSI data is received at 110', method 100 may proceed at 130 by generating a plurality of complementary cumulative distribution function ("CCDF") curves, which may be histograms comparing the error associated with each pixel based on the number of basis vectors utilized. In an embodiment, the error associated with each pixel may comprise the error in each color. For example, as indicated above, the residual vector $\vec{R}$, representing the error in each color may conform to:

$$\vec{R} = \vec{p} - \sum_{k=1}^{N} a_k \vec{b}_k.$$

Figure 2:
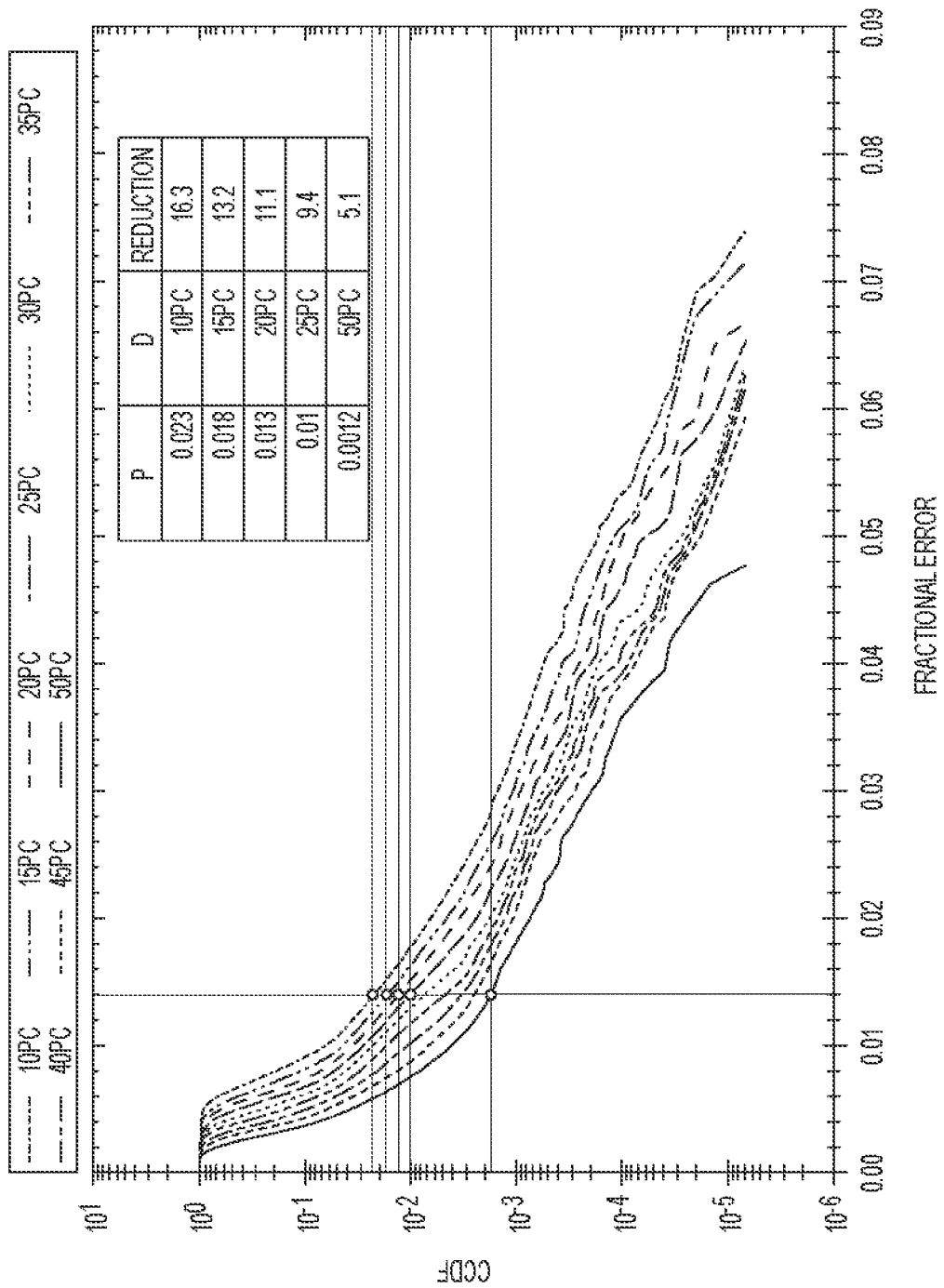
FIG. 2 illustrates an embodiment of a complementary cumulative distribution function.

It may be appreciated that the fractional error may also be computed, specifically by dividing the magnitude $R_{mag}$ of the error vector $\vec{R}$ by the magnitude p of the pixel vector $\vec{p}$, as shown in the example CCDF illustrated in FIG. 2, discussed in greater detail below. It may be appreciated that in some embodiments the C colors may be weighted differently when calculating the magnitude $R_{mag}$ of the error vector $\vec{R}$.

In embodiments where the basis vectors are orthonormal, having unity magnitude and being mutually orthogonal, the calculations may simplify. In particular, the dot product of any two orthogonal vectors is zero, and the dot product of any orthonormal vector with itself is unity. For orthonormal basis vectors the coefficient $a_k$ for any pixel $\vec{p}$ would be the simple dot product:

$$a_k = \vec{p} \cdot \vec{b}_k.$$

Furthermore, the magnitude $R_{mag}$ of the error vector $\vec{R}$ for orthonormal basis vectors is computed by summing the squares of the coefficients in reduced dimensions, allowing for faster error calculations than when the basis vectors were not orthonormal. Thus, the error $R_{mag}$ is the square root of the difference between the magnitude p of pixel vector $\vec{p}$ and the sum of the squares of the DIMRED coefficients $a_k$. Specifically, the error calculation would simplify to:

$$R_{mag} = \sqrt{|\vec{p}|^2 - RSS(a_k)} = \sqrt{\vec{p} \cdot \vec{p} - \sum_{k=1}^{N} a_k^2}.$$

This computation may be especially fast when computing subsets of the full set of N basis vectors. It may be appreciated that some of this increased speed in computation may result from the fact that the magnitude p of each pixel $\vec{p}$ will be constant for a given data set and need only be computed once. Additionally, the summation associated with the coefficients $a_k$ may facilitate using prior coefficient computations to complete subsequent coefficient computations. As an example, it may be understood that the error is dependent upon how many basis vectors are retained from the original set. As such, the error equation may be represented as:

$$R_D = \sqrt{\vec{p} \cdot \vec{p} - \sum_{k=1}^{D} a_k^2},$$

where D represents the number of basis vectors utilized, and may range from 1-N. Accordingly, if D is a first subset of N, then the summation from 1-D may be reutilized when summing to a subsequent, greater subset of N. For example, if computing D=L, D=M, and D=N, where L<M<N, then the error equation for the smallest subset of L basis vectors may be computed according to:

$$R_L^2 = p^2 - \sum_{k=1}^{L} a_k^2,$$

while the error equation for the subset M could be computed according to:

$$R_M^2 = R_L^2 - \sum_{k=L+1}^{M} a_k^2,$$

and the error equation for the full set N could be computed according to:

$$R_N^2 = R_M^2 - \sum_{k=M+1}^{N} a_k^2.$$

It may be appreciated that the example calculations herein, with the error magnitudes $R_{mag}$ being squared, may each by reduced to show the error magnitude $R_{mag}$ by taking the square root thereof. Additionally, while the DIMRED data may generally comprise the set of basis vectors $\vec{b}_k$ and coefficients $a_k$ for each pixel, the pixel magnitude p and/or the error magnitude $R_{mag}$ may be derived therefrom according to the formulas above, or manipulations thereof. Furthermore, when decrementing the number of basis vectors $\vec{b}_k$, by one basis vector at a time, the error R associated with each pixel may be calculated needing only the coefficient $a_k$ having the highest value index. For example, if L=M-1=N-2, then $R_L^2 = R_M^2 = a_M^2$ and $R_M^2 = R_N^2 + a_N^2$. It may be appreciated that one may decrement by more than one basis vector at a time, and perform different search strategies to find the optimum number of basis vectors.

In an embodiment, the CCDF curve may plot the fraction of those errors computed that are above a certain threshold value. One non-limiting example of such a CCDF curve is depicted in FIG. 2, showing the CCDF verses the fractional error computed using a variety of basis vectors. In the example of FIG. 2, the fractional error (as described above) is plotted for several subsets of the N basis vectors computed utilizing principle components (PC). The fraction of pixels above an error level specified by the vertical error line is also illustrated. The embedded table reports the number of basis vectors (i.e. varying values of D, as described above), and the number of pixels above the specified error for certain subsets of the full set of N basis vectors. Further illustrated is the overall reduction in data volume in each case from the original DIMRED data. In particular, it may be appreciated is that the overall data reduction may be computed as the ratio of the number of dimensions of the further reduced set of basis vectors to the number of spectral dimensions C of the original unreduced hyperspectral image data, as described in greater detail below. Accordingly, an associated reduction factor may be computed as the volume of data after further dimensionality reduction compared to the volume of the original data (pixels, spatial locations, and C colors), provided that the number of colors and number of bits per color is constant for each spatial pixel in the data, and that the elements of the coefficients $a_k$ for a given pixel have the same number of bits as the elements of the original colors.

Returning to FIG. 1, it may be appreciated that the plurality of CCDF curves may include a CCDF curve generated at 130a that calculates the errors for each pixel for the entire set of N basis vectors (which again may in some embodiments be all or a subset of the basis vectors utilized to generate the DIMRED data). The plurality of CCDF curves also includes one or more CCDF curves calculating errors for each pixel for a subset of the set of N basis vectors. For example, in the illustrated embodiment of method 100, a CCDF curve generated at 130b calculates the errors for each pixel for a set of M basis vectors, where M is less than N. Additionally, in the illustrated embodiment yet another CCDF curve is generated at 130c calculating the errors for each pixel for a set of L basis vectors, where L is less than M. As indicated above, it may be appreciated that the basis vectors are ranked by some mechanism. As such, the set of L basis vectors utilized in generating the CCDF at 130c may include the L highest ranked basis vectors, while the CCDF curve generated at 130b may include the M highest ranked basis vectors (which includes the L highest ranked basis vectors therein). Although there are three CCDF curves in the plurality of CCDF curves generated at 130 in the illustrated embodiment, in other embodiments, any suitable number CCDF curves (i.e. from two to N CCDF curves) may be generated.

Once the CCDF curves are generated at 130, method 100 may continue at 140, whereby for each CCDF curve, the percent of pixels having an error greater than the user-defined maximum error mxe is calculated. For example, at 140a of the illustrated embodiment, the percent of pixels PN having error greater than maximum error mxe is calculated based on the CCDF curve generated using N basis vectors at 130a. Likewise, at 140b of the illustrated embodiment, the percent of pixels PM having error greater than maximum error mxe is calculated based on the CCDF curve generated using M basis vectors at 130b. Furthermore, at 140c of the illustrated embodiment, the percent of pixels PL having error greater than maximum error mxe is calculated based on the CCDF curve generated using L basis vectors at 130c.

Once the percentage of pixels having error greater than the maximum error mxe is calculated at 140 for each CCDF curve, method 100 may continue at 150 by calculating a reduction factor possible based on the number of basis vectors and the percentage of pixels that can't be adequately described by that number of basis vectors and must be kept in an unreduced form for future processing. In an embodiment, the reduction factor may depend on the number of dimensions (L, M or N) in the DIMRED data (i.e. the number of dimensions of the vector associated with each spatial pixel). In an embodiment where the percentage of pixels to be excluded is represented by PP, in method 100 for exceeding the maximum error mxe, and the number of basis vectors is represented by BV, the reduction factor may conform to the formula [BV(1−PP)+PP*C]/C. As illustrated in FIG. 1, PP may be denoted as PL, PM, or PN for each of the corresponding subsets of the N basis vectors, as described above. It may be appreciated from the reduction factor formula that the quantity (1-PP) represents the fraction of pixels that are able to be further reduced without exceeding the maximum error mxe requirement, and thus would be multiplied by the number of basis vectors BV, while PP itself represents the fraction of pixels that cannot be further reduced because their error exceeds the maximum error mxe, and thus would be multiplied by the number of colors C. Accordingly, as the number basis vectors BV utilized gets smaller, the percentage of pixels that exceed the maximum error mxe would increase, so that there is greater reduction in portions of the DIMRED data that may be further reduced, but there are a greater number of pixels that would need to be set aside as unreduced.

Once the reduction factor for each CCDF curve is calculated at 150, then method 100 may proceed at 160 by selecting the maximum reduction factor. Associated with the maximum reduction factor is a set of $BV_{optimum}$ basis vectors, where $BV_{optimum}$ is the optimum number of basis vectors (i.e. which may be equal to L, M, N, or any other number between 1 and N) that facilitates for maximum additional dimensionality reduction, as well as an associated percentage of pixels that are set-aside as to be not further reduced. In an embodiment, those set aside pixels with computed error exceeding the maximum error mxe, and thus would have to be set aside, may be received from the original HSI data. Knowing the number of basis vectors that facilitate the maximum reduction, and thus reducing data size, while maintaining an error level that is less than the inputted maximum error, allows for the DIMRED data to be further reduced into the further reduced data by utilizing the set of $BV_{optimum}$ basis vectors. It may be appreciated that the elements of the basis vectors and the DIMRED data are sorted in order of importance for retention. For example, the coefficients may be in the order of their discovery, or in order of eigenvalue size. Because of this ordering, the basis vectors and coefficients for each spatial pixel of the DIMRED data may be truncated to further reduce the size of the data. Specifically, the coefficients $a_k$ may be selected to range from 1−$BV_{optimum}$ instead of from 1-N, with those elements between $BV_{optimum}$ and N being discarded. while similar truncation may be applied to corresponding data in the whole spatial scene of the DIMRED data. In an embodiment, by further reducing the DIMRED data as further reduced data, the further reduced data may contain therein the dataset containing the spatial data and a reduced amount of spectral data representing the scene, the set of $BV_{optimum}$ basis vectors, as well as those pixels to be set aside, associated with PP. In some embodiments, the residual vectors associated with the unmixing of given set-aside pixels of the DIMRED data and the set of $BV_{optimum}$ basis vectors may be output along with or instead of the set-aside pixels.

Finally, having determined the maximum reduction factor and the set of $BV_{optimum}$ basis vectors, in some embodiments method 100 may proceed at 170 by outputting the set of $BV_{optimum}$ basis vectors, the further reduced data (truncated from the DIMRED data), and set aside pixels associated with the percentage of pixels PP, that are output in an unreduced state, and may be received from the original HSI data.

Figure 3:
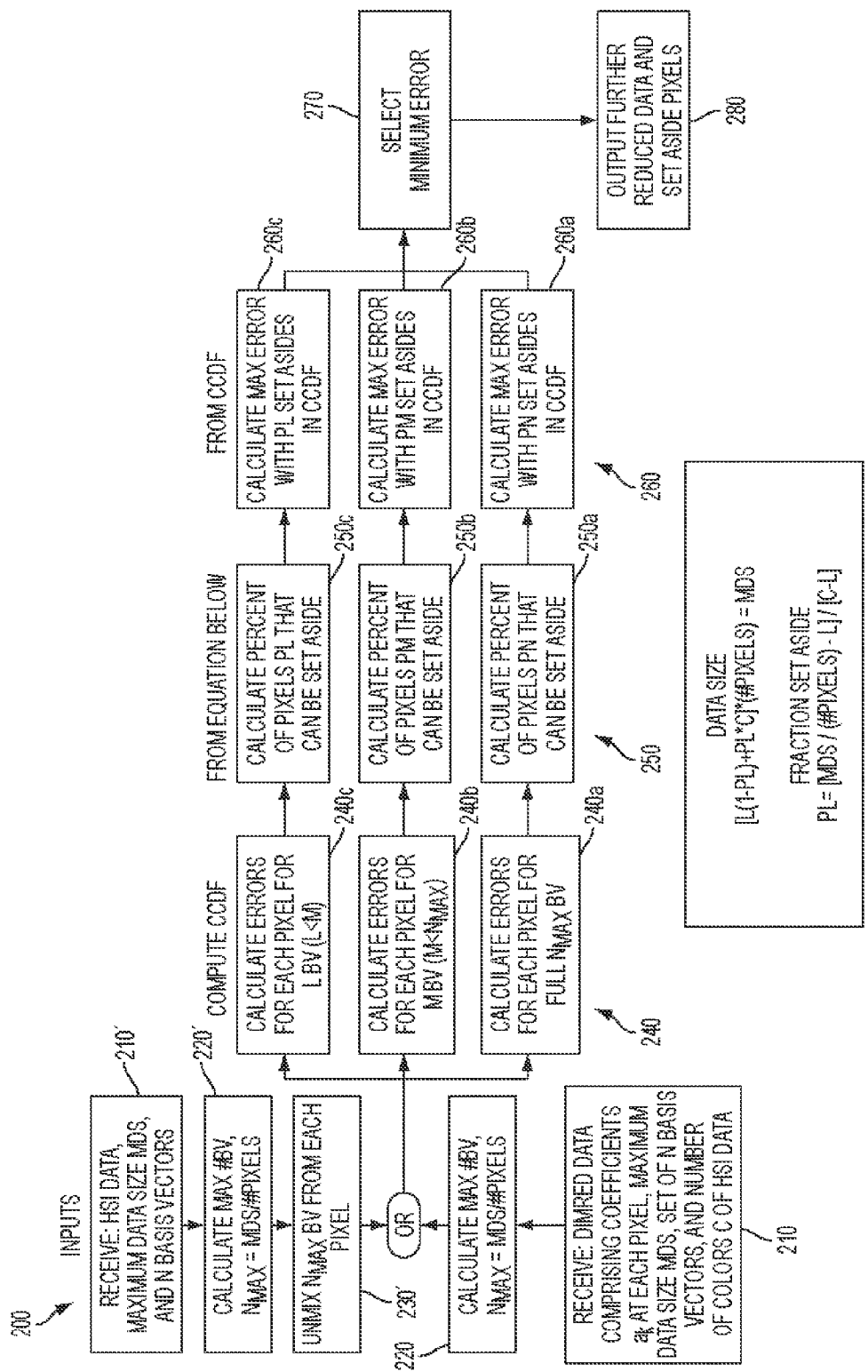
FIG. 3 illustrates an embodiment of a method for further reducing dimensionality of dimensionally reduced data associated with a hyperspectral image, minimizing an error level based on a maximum data size.

Turning to FIG. 3, it is appreciated that in an embodiment there may be method 200 configured to reduce HSI or DIMRED data into further reduced data having a selected maximum data size. To be clear, where the user selects a maximum data size, method 200 is configured to minimize the worst case error of the further reduced data while remaining within the maximum data size of further reduced data. Similarly to method 100, in alternative embodiments of method 200 either the HSI data or the DIMRED data may be received alongside the set of N basis vectors $\vec{b}_k$. Again, where the DIMRED data is received, the number of colors C in the originally associated HSI data may be received as well. As noted above, where the DIMRED data is received instead of the HSI data, the magnitude p of each pixel of the unreduced HSI data may be transmitted with the DIMRED data, such that residual errors for different sets of coefficients may subsequently be calculated. Where the HSI data is received, however, the number of colors C may be readily determined by the number of dimensions associated with each pixel $\vec{p}$ thereof. Accordingly, in an embodiment method 200 may begin at 210 by receiving the user selected maximum data size mds, the DIMRED data (i.e. the set of coefficients $a_k$ associated with each dimensionally reduced pixel $\vec{a}$), and the set of N basis vectors associated with the DIMRED data. In some such embodiments, the DIMRED data and the set of N basis vectors may be similar to that described above pertaining to method 100. Alternatively, method 200 may begin at 210' by receiving the HSI data (i.e. the set of pixels $\vec{p}$), the maximum data size mds, and the set of N basis vectors $\vec{b}_k$. It may be appreciated that where the DIMRED data is received at 210, the HSI data may be available to provide additional set-aside pixels based on the optimization performed in method 200.

Once the DIMRED data or the HSI data and the other inputs are received at 210 or 210', method 200 may continue at 220 or 220' respectively by calculating a new maximum number of basis vectors $N_{max}$, based on the maximum data size mds and the number of spatial pixels in the DIMRED data or the HSI data. It may be appreciated that in some embodiments the DIMRED data (with the exception of set-aside pixels) may generally have the same number of spectral dimensions (N) associated with each spatial pixel. Accordingly, the further reduced data would have the same number of dimensions at each spatial pixel. Thus, by dividing the maximum data size mds by the number of spatial pixels, then a theoretical maximum number of the N basis vectors (i.e. $N_{max}$) may be calculated. While in some embodiments, $N_{max}$ may be equal to or greater than N (i.e. maximum data size mds is sufficiently large to allow the data to remain in its present form), in many embodiments $N_{max}$ would only allow for a subset of the N basis vectors received at 210 or 210' to be utilized. As indicated above, it may be appreciated that the N basis vectors received at 210 or 210' may be in a predetermined order, such as based on an order of importance, or an order of identification. In some embodiments, the order of the N basis vectors may be ascertained by further analysis of the set of N basis vectors following their being received at 210 or 210'. Regardless, it may be appreciated that the $N_{max}$ basis vectors may generally be a subset of the N basis vectors, determined by the maximum data size mds, as well as an ordering of the N basis vectors.

As indicated above, where the HSI data is received at 210', the set of coefficients $a_k$ may be needed to calculate errors associated therewith. Accordingly, after the set of $N_{max}$ basis vectors are determined at 220', method 200 may continue at 230' by unmixing the $N_{max}$ basis vectors from each pixel of the HSI data to generate the DIMRED data with the set of coefficients $a_k$. Again, in some embodiments the computations from the original dimensionality reduction to produce the set of N basis vectors may be included with the HSI data (received at 210' in method 200), or may be accessible to the system performing method 200, and as such, the unmixing at 230' may include generating or otherwise receiving the set of coefficients $a_k$. Once more, unmixing, as used herein without further modifiers, is understood to generically refer to the broad concept of unconstrained unmixing. Similar to method 100, unmixing the basis vectors from each pixel is utilized in calculating the error associated with each pixel. In method 200, however, the error is minimized to further reduce the dimensionality of the data within the maximum data size mds. Again, where the basis vectors are orthonormal, the unmixing step for the $N_{max}$ basis vectors may be completed all at once. It may be appreciated, however, that where the $N_{max}$ basis vectors are not orthonormal, calculating the error with a smaller subset of the $N_{max}$ basis vectors would require repeating the unmixing step for that smaller subset of basis vectors.

Again, it may be presumed in the illustrated embodiment that the basis vectors are orthonormal to one another. As such, once the $N_{max}$ basis vectors are unmixed at 230' to form the coefficients $a_k$, or once the set of $N_{max}$ basis vectors is established at 220, method 200 may proceed at 240 by generating a plurality of CCDF curves, which may be histograms comparing the error associated with each pixel based on the number of basis vectors utilized. As with generating the CCDF curves at 130 in method 100, generating the CCDF curves at 240 may comprise calculating errors for each pixel for at least a subset of the $N_{max}$ basis vectors. As illustrated, in an embodiment the errors may be calculated at 240a for the full set of $N_{max}$ basis vectors. Likewise, errors may be calculated for a subset of M of the $N_{max}$ basis vectors at 240b, while errors may be calculated for a subset of L of the set of M basis vectors may be calculated at 240c. While in embodiments where the $N_{max}$ basis vectors are not orthonormal to each other, the calculation of errors to generate the CCDF cures at 240 may require repeating the unmixing at 230 for each of the subsets of $N_{max}$ basis vectors (i.e. for the set of L basis vectors and the set of M basis vectors), it may be appreciated that the orthonormality of the basis vectors may facilitate easier calculations by eliminating such a step. In different embodiments, any appropriate number of CCDF curves may be generated at 240 (i.e. from two to $N_{max}$ CCDF curves).

After generating the CCDF curves at 240, method 200 may continue at 250 by calculating a percentage of pixels that can be set aside for each of the different sets of basis vectors. It may be appreciated that the maximum data size mds may be generally computed as dependent on the percent of pixels to be excluded or otherwise set aside, again represented as PP, and the total number of colors C in the set-aside pixels (and in the original pixels of the imaged hyperspectral data). Specifically, in an embodiment where the number of pixels is represented by $P_{number}$, the percentage of pixels that can be set aside is represented by PP, the number of colors therein is represented as C therein, and the number of basis vectors is represented by BV, the maximum data size mds may conform to the formula mds=[BV(1−PP)+PP*C]*$P_{number}$. By solving for the percent of pixels PP that can be set aside, it may be computed that PP=[(mds/$P_{number}$)−BV]/(C−BV). Where the number of basis vectors BV differs for each CCDF curve, the computed result would differ. For example, computed at 250a may be the percent of pixels $PP_{(N-max)}$ that are set aside when utilizing the set of $N_{max}$ basis vectors. Likewise, computed at 250b may be the percent of pixels $PP_{(M)}$ that are set aside when utilizing the set of M basis vectors. Furthermore, computed at 250c may be the percent of pixels $PP_{(L)}$ that are set aside when utilizing the set of L basis vectors.

As shown in FIG. 3, method 200 may continue at 260 by calculating the maximum error achievable using the percent of pixels set aside, PP, utilizing the CCDF curves. For example, at 260a, the maximum error may be computed for the percent of pixels $PP_{(N\text{-}max)}$ calculated using the set of $N_{max}$ basis vectors. At 260b, the maximum error may be computed for the percent of pixels $PP_{(M)}$ calculated using the set of M basis vectors. Additionally, at 260c, the maximum error may be computed for the percent of pixels $PP_{(L)}$ calculated using the set of L basis vectors. Having computed the maximum error for each case, dependent upon the number of basis vectors utilized (i.e. $N_{max}$, M, or L, or any other appropriate number), the smallest maximum error based on the percentage of pixels set aside, and the associated size of the basis vector set (i.e. a set of $BV_{optimum}$ basis vectors) associated with that error, may be selected at 270. The given number of basis vectors may facilitate minimizing error while maintaining a data size that is less than the inputted maximum data size mds, such that the DIMRED data may be further reduced into the further reduced data by utilizing the set of $BV_{optimum}$ basis vectors. Method 200 may then continue at 280 by outputting the further reduced data and the set aside pixels, which may be similar to 170 of method 100, whereby the set aside pixels may be received from the original HSI data, while the further reduced data may include a truncated set of coefficients corresponding to the set of $BV_{optimum}$ basis vectors.

Figure 4:
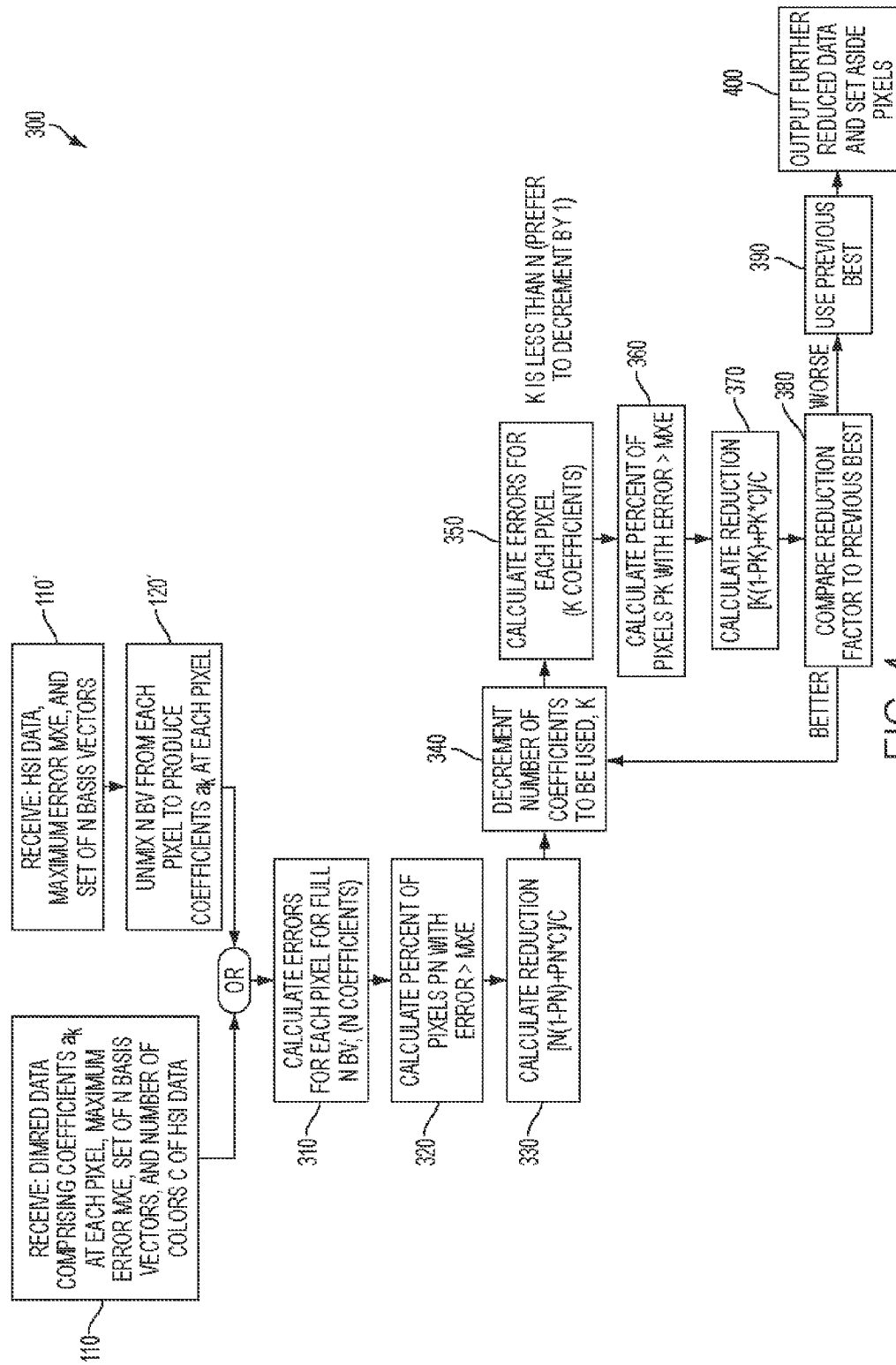
FIG. 4 illustrates an embodiment of another method similar to that of FIG. 1, however utilizing a sequential comparison technique.

It may be appreciated that, in the embodiments of methods 100 and 200 above, error levels associated with particular subsets of the N basis vectors are utilized to compute a set of CCDFs. The CCDFs may determine the number of pixels with errors above the maximum error mxe that may be set aside as uncompressed. In other embodiments the number of basis vectors may begin with the maximum size of N or $N_{max}$ basis vectors, but decrement sequentially to ascertain the best reduction factor or maximum error. Although in an embodiment the number of basis vectors by which the method decrements in each iteration is one, in other embodiments the method may decrement by any other number less than N or $N_{max}$. For example, depicted in FIG. 4 is an embodiment of method 300, which like method 100 is configured to facilitate maximum reduction to minimize data size, within a selected level of maximum error mxe.

As shown, method 300 begins at 110 by receiving the DIMRED data, the selected maximum error mxe, and the set of N basis vectors, or at 110' by receiving the HSI data, the maximum error mxe and the set of N basis vectors. If the HSI data is received at 110', the set of N basis vectors may then be unmixed from each pixel of the HSI data at 120', if the results of such unmixing are not otherwise available from prior calculations. Method 300 may continue at 310 by calculating errors for each spatial pixel for the full set of N basis vectors. It may be appreciated that in an embodiment the error may be calculated as describe above, and may be divided by the magnitude of p to calculate the fractional error. After the errors are calculated, then the percent of pixels with error greater than the maximum error mxe may be ascertained for the full set of N basis vectors at 320, which may be similar to step 130a of method 100, and a reduction factor for the full set of N basis vectors may be calculated at 330, which may be similar to step 140a of method 100.

Method 300 may then continue at 340, whereby the number of basis vectors is decreased by an increment to a subset K of the N basis vectors. Although in embodiments where the basis vectors are not orthonormal, the new set of basis vectors may be unmixed from each pixel, it is appreciated from the above that such a step is unnecessary in embodiments with orthonormal basis vectors. In some embodiments, K may be one less than the previous K (or one less than N for the initial iteration), while in other embodiments a greater decrement may be implemented. Method 300 may continue at 350 by calculating errors for each pixel based on the subset of K basis vectors, which may be performed similarly to the calculations described above. Method 300 may then continue to 360, which mirrors step 130b of method 100, by calculating the percent of pixels associated with the K basis vectors having an error greater than the maximum error mxe, before calculating the reduction factor associated with the K basis vectors at 370, which mirrors 150b of method 100. At 380, the reduction factor ascertained at 370 may be compared to a previous best reduction factor (if any). If the new reduction factor is better than the previous best reduction factor, then method 300 may return to 340, whereby a new value is established for K by decrementing the number of basis vectors by the increment, such that the new set of K basis vectors is a subset of the old set of K basis vectors. Method 300 would then repeat until the newly computed reduction factor is again compared to the previous best reduction factor at 380. If the new reduction factor is worse than the previous best reduction factor, then method 300 may proceed to 390 whereby the previous best reduction factor is established as the maximum reduction factor. Method 300 may then continue at 400 by outputting the further reduced data and set-aside pixels, which may be in a manner similar to 170 described above, such as with set-aside pixels being received from the original HSI data.

It may be appreciated that with each decrement at 340, the dimensionality (and data size) of every pixel is reduced, but the percentage of set-aside pixels above the maximum error increases. Thus, it may be understood that a preferred tradeoff between the data size and the error level may be identified by looping through all values of K, and keeping the best result (i.e. the smallest data volume). The basis vector set associated with the best reduction factor at the end of the sequence may then be utilized to further reduce the HSI or DIMRED data into the further reduced data. It may be appreciated that the gradual decrement of the number of basis vectors depicted in method 300, which again was analogous to method 100, may also be utilized in methods 200, as well as in other non-illustrated embodiments.

In some embodiments, a spectral data base of targets/materials may be unmixed (i.e. through unconstrained unmixing) with the optimum set of basis vectors, to produce a set of coefficients for each target/material. In some embodiments, the residual signature vector of the unmixing process may also or alternatively be computed for comparison to the set-aside pixels from the scene, as described below. The set-aside pixels may be retained in their original form, or the full set of C color information may be may contained in the unmixing coefficients for the N basis vectors plus the residual of the unmixing. It may be appreciated that once the further reduced data is generated, the set of coefficients may be utilized as signatures suitable for comparison to the further reduced data, such as for target identification and analysis. Likewise, the residual vectors of the optimal set of basis vectors may be compared to the residual signature vectors in some such embodiments. In some embodiments, the raw pixel data (i.e. from the set-aside pixels) may be compared to the original signatures. The comparison(s) performed may vary across embodiments, and may include, for example, the vector angle between a pixel and a reference spectrum, a classical matched filter, adaptive cosine/coherence estimator, or other algorithms that treat a pixel as a vector. As in example, the further reduced dimensionality pixels may be compared to a database of reference spectral vectors. The reference vectors may first be reduced by being unmixed with basis vectors, and replacing the original references with the unconstrained unmixing coefficients. Techniques such as, but not limited to, classical matched filter (i.e. spectral matched filter) comparison may then be utilized to compare the further reduced dimensionality pixels with the reference vectors.

In various embodiments the methods described herein may be performed on any number of hyperspectral imaging systems, or on any computing systems configured to receive hyperspectral imagery and/or the DIMRED data associated therewith. The hyperspectral image may be received from any source, on any platform. For example, in some embodiments the hyperspectral image may be obtained from a space based satellite, airplane, or other elevated imaging system. Additionally, in some embodiments the hyperspectral image and/or the DIMRED data may be processed to characterize targets or materials in the imaged scene, or detect changes between various different hyperspectral images captured, or perform other analytics thereon. The hyperspectral imaging system or other computing system performing the methods disclosed herein may contain or otherwise provide a front end interface for one or more local processors associated with the imaging system. In some embodiments, the one or more processors may be configured to analyze the reduced data set for the hyperspectral image without requiring the reduced data set to be decompressed or otherwise processed to reconstruct an original (i.e., unreduced) data set for the hyperspectral image. In some embodiments, a system configured to perform the DIMRED methods described herein may alternatively or additionally be configured to perform the initial DIMRED of the hyperspectral image, wherein the reduced data set can be communicated rapidly to a remote station, which may be a ground station or other remote location where the data set can be further processed. For example, the remote station or other processing locations may analyze the DIMRED data set for the hyperspectral image without further decompression, after further processing of the DIMRED data, or so on.

Although in various embodiments the DIMRED methods described herein may be implemented on any appropriate system or hardware, in some embodiments, the DIMRED methods may be implemented on a computer system, which may generally include typical computer components such as one or more processors, memory modules, storage devices, input and output devices, and so on. In an embodiment, such systems may be maintained in an active memory of the computer system to enhance speed and efficiency, and may further be coupled to a computer network and utilize distributed resources associated with the computer network. In various embodiments, systems operating the DIMRED methods may include one or more interfaces, one or more spectrum readers, and one or more modules that may perform establishing the BV set, decomposing the hyperspectral image, evaluating the hyperspectral image, and performing post-processing of the DIMRED data. In some embodiments, the one or more interfaces may be configured to receive data corresponding to one or more hyperspectral images, one or more BVs provided by a user, an indication as to whether dimensionality reduction is to be performed as a lossy or lossless operation, tolerance levels for the amount of lost data in the dimensionality reduction, and/or other information relating to the processing of hyperspectral images. In an embodiment, the one or more interfaces may be arranged to receive information directly from the user via an input device associated with the system performing the DIMRED methods, or directly from a component of the system or systems.

According to an embodiment, implementations of the various systems and methods for reducing dimensionality of hyperspectral images described herein may be made in hardware, firmware, software, or various combinations thereof. For example, the systems and methods for reducing dimensionality of hyperspectral images may be implemented as computer executable instructions stored on a non-transitory machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Particularly, in some embodiments one or more steps of the methods described above may be omitted or modified. For example, the outputting at 170, 280, or 400 may be omitted in various embodiments, or may include the further reduced data without including the set-aside pixels (thereby facilitating performance of the associated method without access to the original HSI data, in particular embodiments). Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

What is claimed is:

1. A method for reducing dimensionality of hyperspectral image data having a number of spatial pixels, each associated with a number of spectral dimensions, the method comprising:

receiving sets of coefficients associated with each pixel of the hyperspectral image data, a set of basis vectors utilized to generate the sets of coefficients, and a maximum error value;

calculating, using a processor, a first set of errors for each pixel associated with the set of basis vectors, and one or more additional sets of errors for each pixel associated with one or more subsets of the set of basis vectors;

calculating, using the processor, a percent of the number of spatial pixels having an error greater than the maximum error value, for each of the first set of errors and the one or more additional sets of errors;

calculating, using the processor, a plurality of reduction factors associated with each of the first set of errors and the one or more additional sets of errors, the plurality of reduction factors being calculated based on both the percent of the number of spatial pixels having the error greater than the maximum error value and the number of spectral dimensions associated with the hyperspectral image data; and selecting, using the processor, a maximum reduction factor from the plurality of reduction factors, and an optimum size of the set of basis vectors or the subset of basis vectors associated therewith.

2. The method of claim 1, wherein calculating the first set of errors and the one or more additional sets of errors comprises computing plots of the complementary cumulative distribution function associated with the set of basis vectors and the one or more subsets of the set of basis vectors.

3. The method of claim 1, wherein the set of basis vectors are orthonormal to one another.

4. The method of claim 1, wherein said sets of coefficients are generated by unmixing, using a processor, the set of basis vectors from each of the number of spatial pixels of the hyperspectral image data.

5. The method of claim 1, wherein the reduction factors conform to a number of dimensions associated with each of the sets of coefficients divided by a sum of a quantity comprising:
- a size of the set or subset of basis vectors times a percent of pixels with error less than the maximum error, and;
- the percent of pixels with error greater than the maximum error times the number of spectral dimensions associated with the hyperspectral image data.

6. The method of claim 1, wherein the one or more subsets of the set of basis vectors comprise a plurality of incrementally smaller subsets of the set of basis vectors.

7. The method of claim 1, further comprising unmixing the hyperspectral image data with the optimum size of the set of basis vectors to generate further reduced data.

8. The method of claim 7, further comprising setting aside pixels having an error greater than the maximum error value prior to unmixing the hyperspectral image data with the optimum size of the set of basis vectors.

9. The method of claim 8, further comprising outputting the further reduced data and the set aside pixels.

10. The method of claim 1, wherein calculating the first set of errors for each pixel associated with the set of basis vectors comprises utilizing calculations associated with the one or more additional sets of errors associated with the one or more subsets of the set of basis vectors.

11. A method for reducing dimensionality of hyperspectral image data having a number of spatial pixels, each associated with a number of spectral dimensions, the method comprising:

receiving sets of coefficients associated with each pixel of the hyperspectral image data, a set of basis vectors utilized to generate the sets of coefficients, and a maximum data size value;

calculating, using a processor, a maximum number of members in the set of basis vectors based on the maximum data size value and the number of spatial pixels, and establishing a maximum subset of the set of basis vectors associated with the maximum data size;

calculating, using the processor, a first set of errors for each pixel associated with the maximum subset of basis vectors, and one or more additional sets of errors for each pixel associated with one or more subsets of the maximum subset of basis vectors;

calculating, using the processor, a percent of the number of spatial pixels that can be set aside, based on the maximum data size, for each of the maximum subset of basis vectors and the one or more additional subsets of basis vectors;

calculating, using the processor, a plurality of maximum error values associated with each of the percents of the numbers of spatial pixels that can be set aside, associated with each of the maximum subset of basis vectors and the one or more additional subsets of basis vectors; and selecting, using the processor, a minimum error value from the plurality of maximum error values, and an optimum size of the maximum subset of basis vectors or the one or more additional subsets of the maximum subset of basis vectors associated therewith.

12. The method of claim 11, wherein calculating the first set of errors and the one or more additional sets of errors comprises computing plots of the complementary cumulative distribution function associated with the set of basis vectors and the one or more subsets of the set of basis vectors.

13. The method of claim 11, wherein the set of basis vectors are orthonormal to one another.

14. The method of claim 11, wherein said sets of coefficients are generated by unmixing, using the processor, the set of basis vectors from each of the number of spatial pixels.

15. The method of claim 11, wherein the percent of the number of spatial pixels that can be set aside conforms to the quotient of:
- the quantity of the quotient of the maximum data size value and the number of spatial pixels, minus a size of the maximum subset or one or more additional subsets of basis vectors; and
- the number of spectral dimensions associated with the hyperspectral image data, minus the size of the maximum subset or one or more additional subsets of basis vectors.

16. The method of claim 11, wherein the one or more additional subsets of the set of basis vectors comprise a plurality of incrementally smaller subsets of the maximum subset of basis vectors.

17. The method of claim 11, further comprising unmixing the hyperspectral image data with the optimum size of the maximum subset of basis vectors to generate further reduced data.

18. The method of claim 17, further comprising setting aside the number of spatial pixels that can be set aside.

19. The method of claim 18, further comprising outputting the further reduced data and the set aside number of spatial pixels.

20. The method of claim 11, wherein calculating the first set of errors for each pixel associated with the set of basis vectors comprises utilizing calculations associated with the one or more additional sets of errors associated with the one or more subsets of the set of basis vectors.

* * * * *